United States Patent Office 3,562,184
Patented Feb. 9, 1971

3,562,184
CATALYSTS USEFUL IN POLYMER PRODUCTION
Charles G. Dodd, Sylvania, and Peter Christopher Fletcher, Maumee, Ohio, assignor to Owens-Illinois, Inc., a corporation of Ohio
No Drawing. Filed Jan. 3, 1967, Ser. No. 606,541
Int. Cl. B01j *11/40*
U.S. Cl. 252—455                              7 Claims

ABSTRACT OF THE DISCLOSURE

A glass-ceramic catalyst formed by thermal crystallization from a silicate glass composition having dissolved or dispersed therein chromium ions calculated as $Cr_2O_3$.

---

The present invention relates to olefin polymerization and, more particularly, to olefin polymerization in the presence of novel solid catalysts formed from glass compositions and from thermally crystallizable glass compositions. In one aspect, the invention relates to the polymerization of olefins wherein the reaction proceeds in the presence of a silicate glass catalyst or a thermally crystallized silicate glass-ceramic catalyst which is produced by controlled, in situ crystallization. In another aspect, the invention relates to novel silicate glass catalysts and silicate glass-ceramic catalysts suitable for promoting the polymerization of olefin monomers.

Many processes for forming olefin polymers and copolymers are known in the art. Among the more important ones are those relating to the polymerization of ethylene monomers to polyethylene, with innumerable variations being possible in the product thus produced. The properties of the final product are determined, to a large extent, either by its density, molecular weight, molecular weight distribution, or any combination of these three parameters. In one process, a chromium oxide catalyst supported on a silica, alumina, zirconia or like support is utilized. Another process uses an organo-metal catalyst consisting of a metal halide, such as titanium tetrachloride, and an aluminum alkyl, such as triethyl aluminum. Still another process utilizes a catalyst consisting of molybdena on an alumina support with sodium, calcium, or their hydrides as promoters.

In the case of many conventional catalysts used in polymerization reactions, the catalyst is formed by dispersing a metal or a metallic salt or oxide over the surface of a gel or other support material which is designed to present the greatest possible surface area to the reacting fluid monomers. Generally, the catalytically active material is in the form of a film or a relatively thin and fragile coating on the support. In this form, the catalyst may be relatively easily poisoned by materials that react specifically with the catalyst and would thus markedly reduce the ability of the catalyst to catalyze the desired reaction. Many problems are associated with and directly affect catalyst behavior and, thus, the efficiency of the polymerization reaction. Among the factors which determine the suitability or value of a particular catalyst are its resistance to poisoning, its mechanical strength, its ease of activation, its ability to retain its activation, its ease of storage and handling, its stability, its resistance to moisture, and the like.

Accordingly, it is an object of this invention to polymerize olefin monomers in the presence of new and novel catalysts having properties and characteristics which enable them to overcome many of the disadvantages of the prior art catalysts.

A further object of this invention is to provide a process for polymerizing olefin monomers in the presence of catalysts which are highly resistant to poisoning prior to or during polymerization, have high mechanical strength, are readily activated, and can be easily handled and stored.

Another object of this invention is to polymerize olefin monomers in the presence of a silicate glass or a silicate glass-ceramic having a catalytically active ingredient for the promotion of the polymerization reaction chemically bonded to and forming an integral part of the glass or glass-ceramic.

Still another object of the present invention is to provide a silicate glass and an in situ crystallized silicate glass-ceramic having incorporated therein a catalytic substance which makes the glass and glass ceramic useful as catalysts for olefin polymerization reactions.

Another object of this invention is to provide a process for forming a silicate glass and an in situ, thermally crystallized glass-ceramic having a metal-containing catalytic agent as an integral part thereof and suitable as catalyst for the process of polymerizing olefins.

In attaining the foregoing objects, one feature resides in forming a silicate glass composition having dissolved or dispersed therein chromium ions calculated as $Cr_2O_3$, and then utilizing the glass, per se, or after it is thermally crystallized to a glass-ceramic, as a catalyst in the process of polymerizing olefin monomers. When used as a catalyst, the glass or glass-ceramic is preferably in very fine particulate form, or in sintered pellet form.

Another feature resides in forming the glass catalyst or glass-ceramic catalyst from a glass composition of the silica-alumina-calcia-chromium system.

The above, as well as other objects, features, and advantages of the present invention, will become apparent from the following detailed description thereof.

For the purposes of this invention, when reference is made to olefin polymerization, it is to be understood that olefin monomers, i.e., unsaturated aliphatic hydrocarbons of the general formula $C_nH_{2n}$ and unsaturated aryl hydrocarbons such as styrene, are reacted until polymers of varying viscosities, molecular weight and densities are produced. The term olefin includes ethylene, propylene, butylene, and the like, and also the 1-olefins, such as 1-butene, 1-pentene, 1-hexene, 1-heptene, 1-octene, 4-methyl-1-pentene; and the diolefins, such as butadiene and isoprene. The olefins may be substituted, such as by a lower alkyl group and the like, provided the groups do not adversely affect the polymerization reaction. While the invention will be described in terms of polymerizing ethylene, this is not to be construed as limiting the invention to this particular olefin species, since the other olefins can also be polymerized in similar fashion. Likewise, copolymerization, as between ethylene and propylene, ethylene and 1-butene, and similar monomers, can also take place in accordance with the disclosure of this invention.

It has also been found, as one aspect of this invention, that olefin monomers can be polymerized or copolymerized to polymers and copolymers by having the polymerization reaction proceed in the presence of a powdered silicate glass or a powdered silicate glass-ceramic having completely dispersed, dissolved, and incorporated therein as an integral chemical part of the structure, chromium ions, calculated as $Cr_2O_3$.

A glass composition having the following essential ingredients within the disclosed ranges is suitable as a catalyst for the polymerization of olefin monomers such as ethylene to polymers such as polyethylene.

| Ingredients: | Weight percent |
|---|---|
| $SiO_2$ | 45–65 |
| $Al_2O_3$ | 10–15 |
| CaO | 15–25 |
| $Cr_2O_3$ | 1–30 |

Examples of glasses coming within the foregoing ranges were prepared by mixing and then melting the following raw materials for 17 hours at a temperature of 2900° F. while continuously stirring the molten batch:

|  | Glasses, parts by weight | | |
| --- | --- | --- | --- |
|  | A | B | C |
| Ingredients: | | | |
| Amersil quartz ($SiO_2$) | 194.5 | 279.0 | 248.0 |
| R. R. Alundum ($Al_2O_3$) | 70.0 | 66.5 | 59.0 |
| Calcium carbonate | 198.9 | 188.1 | 166.1 |
| Chrominum oxide ($Cr_2O_3$) | 25.0 | 50.0 | 100.0 |

The batches were then cooled and samples of each batch analyzed for the particular metal oxides. The analysis showed the following compositions for the respective glasses:

|  | Glasses | | |
| --- | --- | --- | --- |
|  | A | B | C |
| Ingredients: | | | |
| $SiO_2$, percent | 58.9 | 55.8 | 49.6 |
| $Al_2O_3$, percent | 14.0 | 13.3 | 11.8 |
| CaO, percent | 22.1 | 20.9 | 18.6 |
| $Cr_2O_3$, percent | 5.0 | 10.0 | 20.0 |
| Total | 100.0 | 100.0 | 100.0 |

Each of the glasses was a deep green color as would be expected from the $Cr_2O_3$ content. While the chromium ion content is expressed as trivalent chromium and is present as such, it will be understood by those in the glass art that a certain amount of hexavalent chromium is also present in the glass. This amount can best be described as an "equilibrium" amount.

Further, while $Cr_2O_3$ was added to the above melt to form the glasses, it will be understood that any chromium-containing compound which will form the $Cr_2O_3$ in the final glass will be suitable for the purpose of the invention, provided, of course, that the compound does not contain other elements which may tend to affect the catalytic properties of the glass or glass-ceramic. While the glasses in the above table contain only four metal oxides, it is to be understood that varying but small amounts of other metal oxides may also be present in the glass provided that they are present only as traces or impurities, or else that they are compatible with the basic glass structure in that they will not adversely affect the olefin polymerization reaction.

The following examples are merely illustrative of olefin polymerization reactions which occur in the presence of the novel glass and glass-ceramic compositions of the present invention and are not to be considered limiting the scope of the invention in any manner.

EXAMPLE I

Glass A was crushed to a powder or −250 mesh size in order to provide a large surface area. Using distilled water as a binder, the glass powder was formed into a paste which was then pressed by means of a mechanical die into glass pellets having a ⅛ inch diameter and a thickness of about ¹⁄₁₆ inch. The pellets were fired in a platinum boat within a temperature range of 816–871° C. for exactly five minutes. The resulting sintered porous glass pellets had good mechanical strength. The surface area of the pellets was 0.1±0.01 m.²/gm. The average pore diameter was approximately 8 to 10 microns.

50 grams of the pellets were then heated at 400° C. in a closed chamber for 1 hour in a stream of dry nitrogen and then sealed in glass tubes under dry nitrogen.

An autoclave, which had been cleaned by maintaining it at a temperature of 100° C. overnight while nitrogen flowed therethrough, was used as the polymerization reactor. The 50 grams of catalyst pellets were introduced into the reactor under a nitrogen purge to avoid atmospheric contamination. 300 cc. of heptane as solvent were added to the reactor together with 2.5 cc. of triethylaluminum. Ethylene previously heated to a temperature of 100° C.±5° C. was then introduced into the reactor and maintained therein at a pressure of from 460 to 470 p.s.i. for a period of eight hours. 13 grams of polyethylene solid was formed at the end of this time. Infrared analysis of the solid, using procedures known in the art, definitely confirmed that polyethylene was formed. Its density was 0.941 gr./cc. and it melted at a temperature of 205° C.

EXAMPLE II

Glass B was heated for 16 hours at 838° C. and formed a partially crystallized glass-ceramic.

Example I was repeated, except that pellets of Glass B were used in lieu of Glass A, all other conditions being the same. Polyethylene was formed and this was again confirmed by infrared analysis. X-ray diffraction study of Glass B showed that it has alpha-crystobalite as its principal phase and the composition is a glass-ceramic. Chromium oxide was in the glassy phase and in the crystalline phase.

EXAMPLE III

Glass C was crushed to −230 mesh and was heated at 950° C. for 72 hours, forming a thermally crystallized glass ceramic. 0.5 gram samples were heated at 400° C. for 1 hour in a stream of dry nitrogen and then sealed in glass tubes under dry nitrogen. Three runs were made in the autoclave of Example I, using heptane solvent and triethylaluminum. The following table summarizes the conditions at which each sample was run:

| | Time, hours | Temperature, °C. | Ethylene pressure, p.s.i. | Triethylaluminum, g. | Yield, gm. |
| --- | --- | --- | --- | --- | --- |
| Run number: | | | | | |
| 1 | 24 | 100 | 725 | 1.5 | 8 |
| 2 | 24 | 150 | 725 | 1.5 | 28 |
| 3 | 72 | 100 | 550 | 1.5 | 18 |

Infrared analysis of each solid produced during the polymerization reactions confirmed that polyethylene had been formed. The product of run 1 melted at 235° C. The product of run 2 was a waxy solid which melted within the range of 120–125° C., and the infrared analysis indicated considerable unsaturation. While increasing the reaction temperature increased the yield, it also seemed to decrease the molecular weight of the polyethylene product.

While in the foregoing examples, heptane is used as the preferred solvent, it is to be understood that any hydrocarbon solvent which is inert and remains liquid under the polymerization conditions may be used. Propane, butane, normal pentane, isopentane, normal hexane, isohexane, normal octane, and similar solvents, may be used. Others are known in the art.

EXAMPLE IV

A reaction vessel whose chamber contained 0.25 gm. of powdered Glass C of −250 mesh size was heated to 400° C. for three hours while simultaneously being subjected to vacuum to remove impurities such as water vapor, oxygen, and the like, from the surface of the catalyst and the system. The residual gas pressure over the sample was $10^{-3}$ to $10^{-4}$ millitorr. After cooling the reaction chamber to room temperature, the sample in the chamber was isolated, while the remainder of the system was flushed with ethylene. The system was then pressurized with ethylene at 250 p.s.i., and the reaction chamber was opened to the ethylene at this pressure. The ethylene had been preheated to 100° C. and the reaction chamber was maintained at 100° C. The reaction was allowed to proceed for 16 hours. At the end of this period, the reaction vessel was filled with the polymer, thereby preventing further access of monomer to the catalyst. Infrared analysis confirmed that the polymer was polyethylene.

In the gas phase system described in Example IV, surface cleaning of the catalyst appears to be a time-temperature function. At a standard evacuation time of three hours, a baking temperature of 400° C. is preferable. However, if a lower temperature of 300° C. is utilized, the polymer yield is increased if the catalyst is cleaned for a period of more than three hours, i.e., 4 to 6 hours rather than for only three hours. Further, it is preferable to introduce the ethylene heated to 100° C. into the reaction chamber and maintain the reaction at this temperature. While polymerization will occur if the system is cooled to 250° C., the polymer yield is adversely affected.

Polyethylene has also been formed by subjecting ethylene monomer to polymerization conditions in the presence of the following glass catalysts:

| Ingredient | Glasses, weight percent | |
|---|---|---|
| | D | E |
| $SiO_2$ | 61.4 | 43.4 |
| $Al_2O_3$ | 14.6 | 10.3 |
| CaO | 23.0 | 16.3 |
| $Cr_2O_3$ | 1.0 | 30.0 |
| Total | 100.0 | 100.0 |

Each of the foregoing Glasses A to E inclusive, coming within the composition ranges set forth above, has been found to be an active glass catalyst or glass-ceramic catalyst for polymerizing olefin monomers. However, the total surface areas of these catalysts exposed to the monomers, after the catalyst is crushed to powder of about −250 mesh size, is about $0.1 \pm 0.01$ m.$^2$/gm. Even though this total surface area is relatively small, compared to commercial catalysts having areas as high as 300 m.$^2$/gm., the effectiveness of the catalysts of this invention in promoting olefin polymerization, relative to the commercial catalysts, is superior, i.e., extremely more active on a per-unit-surface area basis.

Other silicate glass catalysts having high porosity, permeability and chemically active surfaces, and also suitable for the polymerizing of olefin monomers are those having the following compositions, expressed in percents by weight.

Ingredient: Percent
    $SiO_2$ _____ 45–65
    $B_2O_3$ _____ 15–30
    $Al_2O_3$ _____ 0–15
    $Na_2O$ _____ 6–12
    CaO _____ 0–35
    $Cr_2O_3$ _____ 0.3–30

A sample glass coming within the above formulation was prepared by mixing and melting the following raw materials in the indicated parts by weight at a temperature of 2700° F. for 17 hours, while continuously stirring the melt.

Ingredient: Parts by weight
    Silica (research grade) _____ 63.9
    $B_2O_3$ (research grade) _____ 26.0
    Sodium carbonate (research grade) _____ 9.8

The resulting glass had the following composition expressed in percent by weight:

GLASS F

Ingredient: Percent
    $SiO_2$ _____ 65.0
    $B_2O_3$ _____ 26.0
    $Na_2O$ _____ 9.0

To a cullet of Glass F was added 5% by weight of $Cr_2O_3$ powder and the mixture was melted at $1280° \pm 20°$ C. for 10 minutes. 2% by weight $Na_2B_4O_7$ was added to compensate for volatilization during remelting. The sample was then maintained at 570° C. for 24 hours to produce a material composed of two independent interconnected amorphous phases. The sample was then leached in 3 normal hydrochloric acid for 18 hours. The resulting material was a high silica glass containing most of the chromium, with high porosity, permeability, and a chemically active surface.

Additional glasses were made as described above and having the following compositions:

| Ingredients | Glasses, weight percent | | | | |
|---|---|---|---|---|---|
| | G | H | I | J | K |
| $SiO_2$ | 59.5 | 62.5 | 46.7 | 46.8 | 49.8 |
| $B_2O_3$ | 25.3 | 26.5 | 20.1 | 20.2 | 21.4 |
| $Al_2O_3$ | | | | 20.0 | |
| $Na_2O$ | 10.0 | 10.5 | 8 | 8 | 8.5 |
| CaO | | | | 20.0 | |
| $Cr_2O_3$ | 5.0 | 0.3 | 5.0 | 5.0 | 20.0 |

After leaching in the manner described above, the glasses had the corresponding compositions, again expressed in terms of percent by weight:

| Ingredients | Glasses | | | | |
|---|---|---|---|---|---|
| | G | H | I | J | K |
| $Cr_2O_3$ | 4.8 | | 5.7 | 4.3 | 26.7 |
| $CrO_3$ | 0.0014 | | 0.04 | 0.19 | 0.06 |
| $SiO_2$ | 87.43 | | 61.40 | 66.4 | 66.6 |
| $Na^+$ | +0.5 | | | | 0.62 |
| $Al_2O_3$ | | | 12.7 | .58 | |
| CaO | | | 0.55 | 11.0 | |
| $Na_2O$ | | | 3.75 | 3.8 | |
| $B_2O_3$ | (¹) | | 9.4 | 8.9 | (¹) |

¹ Remainder.

Each of the glasses had a surface area of about 300 m.$^2$/gm. and resembled coarse grains of sand in appearance. Porous glasses having a total surface area of from 100–350 m.$^2$/gm. and more can readily be made.

EXAMPLE V

A 0.421 gram sample of Glass F catalyst was heated for 1 hour at 400° C. and sealed under nitrogen in a glass tube. The catalyst was used in lieu of the catalyst in Example I, all other conditions being the same, except that the amount of heptane solvent was 450 cc. and the triethylaluminum was 1.5 cc. Ethylene pressure was maintained at 450 p.s.i. The polymer which was produced was subjected to infrared analysis and found to be polyethylene. It melted within the temperature range of 205–210° C.

EXAMPLE VI

The procedure of Example V was repeated except that 0.5 gram of Glass F catalyst was used and 1.5 cc. of diethylaluminum chloride was used in lieu of the triethylaluminum. The formed polymer was found to be polyethylene, as confirmed by infrared analysis, and the polymer melted within a temperature range of 215–220° C.

EXAMPLE VII

The polymerization reaction of Example IV was repeated using 0.5 gram of Glass G catalyst in lieu of the Glass C catalyst. Polyethylene was produced, confirmed by infrared analysis. The reaction chamber was completely filled with the polymer at the completion of the reaction.

Using Glasses H, I, J, and K in lieu of the glass catalysts of Examples V and VII, polyethylene was also produced.

The catalytic activity of the various glasses described above appears to be a function of the chromium content of both the large surface area and the small surface area materials. It appears, however, that for each type of glass catalyst, there is a maximum value for the chromium content. For the silicate glasses and silicate glass-ceramics having a small surface area, i.e. $0.1 \pm 0.001$ m.$^2$/gm., the maximum chromium content value, indicated as $Cr_2O_3$, is about 20% by weight of the composition. Having a higher chromium content in the catalyst does not appear to increase the polymer yield. In glass catalyst compositions having a high surface area, the maximum amount of chromium, expressed as $Cr_2O_3$, appears to be about 5% by weight of the composition. Again, more than this amount of chromium in the catalyst does not increase the polymer yield.

While the catalysts of the invention are glass catalysts and glass-ceramic catalysts, there does not appear to be any advantage of favoring one over the other. Both types appear to function equally effectively in the olefin polymerization reaction. Further, the catalytic agent in the glass and glass-ceramic is $Cr_2O_3$ wherein the chromium ion is in the trivalent state. While 99% and more of the ion is in this state, there is some hexavalent chromium ion in the catalyst. The amount is very small and exists in equilibrium. Efforts have been made to oxidize the trivalent chromium ion to the hexavalent state, and catalysts containing about 96% to 97% of the chromium as $Cr_2O_3$ and the remainder as $CrO_3$ were used in the olefin polymerization reaction. No noticeable improvement was noted in the reaction or the yield.

Chromium oxide expressed as $Cr_2O_3$, per se, has no catalytic activity in promoting the polymerization of olefins. However, by incorporating the $Cr_2O_3$ as an integral part of the silicate glass or silicate glass-ceramic structure, some degree of control over the catalyst structure is obtained. It appears that the glass orients the chromium ions in such a way that the $Cr_2O_3$ has the necessary catalytic activity. By varying the constituents of the glass composition, the orientation of the chromium ions can also be varied, thus imparting an even greater degree of control over the final catalyst. Thus the catalysts can be prepared in a particular manner for specific purposes, such as controlling density, molecular weight, or other properties of the final polymer. Such control is more difficult to achieve when $Cr_2O_3$ or other catalytic agents are merely placed on support gels and the like by a coating or impregnating operation.

While reference has been made above to silicate glass-ceramics and specific examples have been set forth for obtaining such products, it is to be understood that glass-ceramic catalysts in accordance with the invention can readily be made by those in the art from thermally crystallizable glass compositions having incorporated therein the catalytic agent. These compositions, containing one or more nucleating agents, are subjected to a controlled crystallization upon proper sequence of temperature treatment and form a crystallized glass-ceramic of catalytic activity. The crystallized glass-ceramic product contains a multiplicity of finely divided crystals in random orientation dispersed within a glassy matrix.

The optimum heat treatment to produce the crystallization depends on the specific glass composition chosen, the ratio of its ingredients, the type and amount of its nucleants, as well as the final properties desired. For that reason it is not possible to specify a particular heat treatment schedule that will be common to all of the glasses. However, it is usually preferred that the first heat treatment step be carried out at a relatively low temperature, i.e., in the region of maximum, or high rate, of nuclei or crystallite formation. Nuclei are defined as submicroscopic precursors of crystalline species or a finely dispersed submicroscopic immiscible glassy phase. It is difficult to measure directly the area or range of temperature in which the maximum rates of nuclei formation occur. However, this temperature usually lies in the range of from 30° F. below the annealing point of the glass to 250° F. above the annealing point of the glass.

In most instances, the thermally crystallizable glass composition is heated within the foregoing initial temperature range for a time of from about 15 minutes to one hour or more, after which it is heated at a higher temperature to complete crystallization to the desired degree. The maximum temperature for this crystallization step is usually not more than 350° F. above the annealing point of the glass.

If desired, it is possible to complete the nucleation and subsequent crystallization by effecting the entire heat treatment at the same low temperature as the initial or nucleating heat treatment temperature. Naturally, the heat treatment at these lower temperatures will take a longer time than if the temperature were raised for the final crystallization. In the resulting product, a crystalline phase is dispersed throughout the glassy matrix. When reference is made to silicate "glass-ceramic" in this specification and in the claims attached hereto, it is to be understood that the final product is not necessarily completely crystallized but, instead, can have a glassy matrix and a crystallized portion dispersed therethrough.

As is evident from the above examples, the ethylene is introduced into the reaction chamber at a pressure within the range of 200 to 800 p.s.i. Pressures of about 250 p.s.i. to about 725 p.s.i. are preferred.

It is also to be understood that water, carbon monoxide and other materials known to be poisonous to olefin polymerization catalysts are to be removed from the olefin feed prior to its introduction into the reaction chamber. Removal methods are well known in the art.

The polyethylenes formed by the processes disclosed above are low density and high density polyethylenes having a density coming within the range of about 0.92 to 0.96. Low density polyethylene is suitable for film and sheeting in the packaging field, particularly for produce, baked goods, frozen foods, meats and poultry, and the like. High density polyethylene is suitable for blow-molding applications, and finds its outlet in the manufacture of bottles for detergents, bleaches and, more recently, for milk, oils, and household powder chemicals.

It will be apparent to those skilled in the art that variations and modifications of the invention can be made from a study of the foregoing disclosure. Such variations and modifications are believed to be clearly within the spirit and scope of the invention.

What is claimed is:

1. A thermally crystallizable glass composition suitable for use as a catalyst for promoting olefin polymerization, said composition consisting essentially of the following ingredients expressed in percent by weight.

| Ingredient: | Percent |
| --- | --- |
| $SiO_2$ | 45–65 |
| $Al_2O_3$ | 10–15 |
| CaO | 15–25 |
| $Cr_2O_3$ | 1–30 |

2. A thermally crystallized glass ceramic of the composition defined in claim 1.

3. The thermally crystallizable glass composition of claim 1 having the following ingredients expressed in percent by weight.

| Ingredient: | Percent |
| --- | --- |
| $SiO_2$ | 58.9 |
| $Al_2O_3$ | 14.0 |
| CaO | 22.1 |
| $Cr_2O_3$ | 5.0 |

4. The thermally crystallizable glass composition of claim 1 having the following ingredients expressed in percent by weight.

| Ingredient: | Percent |
| --- | --- |
| $SiO_2$ | 55.8 |
| $Al_2O_3$ | 13.3 |
| CaO | 20.9 |
| $Cr_2O_3$ | 10.0 |

5. The thermally crystallizable glass composition of claim 1 having the following ingredients expressed in percent by weight.

| Ingredient: | Percent |
|---|---|
| $SiO_2$ | 49.6 |
| $Al_2O_3$ | 11.8 |
| CaO | 18.6 |
| $Cr_2O_3$ | 20.0 |

6. The thermally crystallizable glass composition of claim 1 having the following ingredients expressed in percent by weight.

| Ingredient: | Percent |
|---|---|
| $SiO_2$ | 61.4 |
| $Al_2O_3$ | 14.6 |
| CaO | 23.0 |
| $Cr_2O_3$ | 1.0 |

7. The thermally crystallizable glass composition of claim 1 having the following ingredients expressed in percent by weight.

| Ingredient: | Percent |
|---|---|
| $SiO_2$ | 43.4 |
| $Al_2O_3$ | 10.3 |
| CaO | 16.3 |
| $Cr_2O_3$ | 30.0 |

References Cited

UNITED STATES PATENTS

| 2,472,490 | 6/1949 | Plank | 252—432 |
| 2,804,482 | 8/1957 | Hunter et al. | 252—458 |
| 2,834,738 | 5/1958 | Vincent | 252—455X |
| 2,884,308 | 4/1959 | Fierce et al. | 23—151 |
| 3,165,504 | 1/1965 | Hogan | 252—455 |
| 3,189,563 | 6/1965 | Hauel | 252—455X |
| 3,305,371 | 2/1967 | De Lajarte | 106—52 |
| 3,364,042 | 1/1968 | Swain et al. | 106—52 |
| 3,416,936 | 12/1968 | Sproul, Jr. | 106—52 |

FOREIGN PATENTS

| 713,282 | 8/1954 | Great Britain | 252—458 |

DANIEL E. WYMAN, Primary Examiner

C. F. DEES, Assistant Examiner

U.S. Cl. X.R.

252—457, 458; 260—94.9

PO-1050
(5/69)

UNITED STATES PATENT OFFICE
CERTIFICATE OF CORRECTION

Patent No. 3,562,184     Dated February 9, 1971

Inventor(s) Charles G. Dodd and Peter C. Fletcher

It is certified that error appears in the above-identified patent and that said Letters Patent are hereby corrected as shown below:

Column 3, line 8, "194.5" should be --294.5--;

Column 4, line 24 "-230" should be -- -250--;

Signed and sealed this 13th day of July 1971.

(SEAL)
Attest:

EDWARD M. FLETCHER, JR.
Attesting Officer

WILLIAM E. SCHUYLER
Commissioner of Pat